April 20, 1965   R. O. CARTER   3,179,477
SELF-ALIGNING SPHERICAL BEARING ASSEMBLY AND
METHOD OF ASSEMBLING SAME
Filed June 30, 1961

INVENTOR
RICHARD O. CARTER
BY
ATTORNEYS

United States Patent Office 3,179,477
Patented Apr. 20, 1965

3,179,477
SELF-ALIGNING SPHERICAL BEARING ASSEMBLY AND METHOD OF ASSEMBLING SAME
Richard O. Carter, Spring Lake, Mich., assignor to Miniature Precision Bearings, Inc., a corporation of New Hampshire
Filed June 30, 1961, Ser. No. 121,250
5 Claims. (Cl. 308—72)

This invention relates to a spherical bearing assembly and more particularly to a self-aligning spherical bearing assembly and method of assembling the same wherein the outer race member of the bearing assembly comprises a hardened material.

Spherical bearing assemblies comprise a number of different types which are assembled by a number of different methods. One method, called swaging, is to have the outer race formed of a material having a low yield point which is then press-formed around a hardened steel ball which serves as the inner bearing member. A difficulty of this type of bearing assembly and method of assembling the same is that the choice of material of the bearing members is restricted since the inner bearing member must be hard enough to serve as a die while the outer race must be soft enough to form. With this method of assembly, it is impossible to use balls or inner bearing members which are made of a porous metal and which may be impregnated with a lubricant because of the relatively low yield point of porous metal. Further with this method of assembly, the contact area between the ball and the spherical race cannot be controlled or checked before or after assembly. Often when spherical bearings are assembled by the swaging method, the main contact area between the inner spherical bearing member and outer race member is at the extreme edges of the spherical area of the outer race and since the outer member comprises a malleable material, it will yield causing excess looseness in the bearing. Another difficulty arising when using this method of construction is that the malleable material comprising the race is always under compression when the bearing assembly is under a radial load and thus will tend to yield so allowing the radial clearance between the ball and the race to become excessive.

Broadly, I make the spherical bearing assembly by first making the outer race of any heat treatable metal material to the desired dimensions, scoring the race member either along a line parallel to the longitudinal axis of the race member on the outside diameter, which scoring can be in the form of a sawed, or milled slot, an etched line, or any method of releasing the stress along a straight line parallel to the longitudinal axis of the race member. In addition, an alternate method of scoring, or notching may be used, by preforming the operation with radially extending grooves which are parallel to each other and on one point of opposite face areas, this too can be any method of relieving the stress at these points by scoring. The advantage of this latter method as concerns spherical bearings is that in certain types of plain spherical bearing assemblies it is necessary to provide a grease groove passage at the center line of the outside diameter of the race and with the face scoring this can then become an uninterrupted groove, whereas if the race is scored in a longitudinal axis on the outside diameter, this scoring line would interrupt the passage of grease or lubrication when applied to the bearing. The race is then heat treated to the desired hardness, fractured at one point along the score line, the fractured ends of the race member forced apart, a barrel-shaped spherical bearing member inserted so that its longitudinal axis is perpendicular to the longitudinal axis of the race member, the inner bearing member rotated after it is inserted in the race so that its longitudinal axis is substantially parallel to the longitudinal axis of the outer race member, and then the fractured ends of the race member are allowed to spring together. By this type of construction, no pressure is applied against the inner bearing surface during assembly so that any type of metal may be used for the inner bearing member, including relatively soft sintered porous material or hardened steel.

After the fractured ends of the outer race have been allowed to spring back together, the outer race may be inserted into a ring or housing in order that the fractured ends may be held together or the outer race may be held together by means of metal clips.

In another embodiment of the invention, the outer race may be inserted into a rod end which will lock the fractured ends together and the inner bearing member may have an aperture extending therethrough to receive another rod or a stud.

Referring to the drawings in which preferred embodiments of my invention are illustrated, FIG. 1 is a front view of a fractured outer race of a spherical bearing constructed according to my invention;

Figure 1:
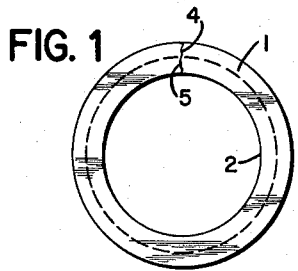
Figure 2:
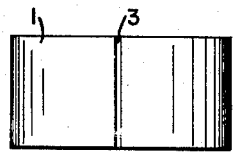
FIG. 2 is a plan view of the race illustrated in FIG. 1 before fracture.

Referring initially to FIGS. 1 and 2, there is illustrated an outer race member 1 having an inner spherical surface 2. The outer race member, which may comprise any relative hard material, is first accurately shaped by machining to the desired dimensions. A score line 3 is then cut on the outer periphery of the race in a direction parallel to the longitudinal axis of the race member. The race member, if it comprises a material such as steel, is then heat treated to give the desired hardness factor. I have found that outer race members may be heat treated to a hardness of 60 Rc.

Figure 3:
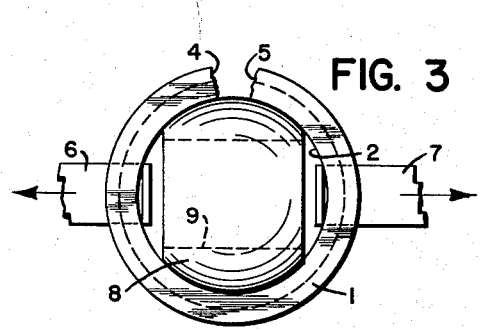
FIG. 3 is a view similar to FIG. 1 showing the fractured ends of the outer race spread apart by spreaders and a spherical bearing inserted therein with its longitudinal axis perpendicular to the longitudinal axis of the race.

After hardening, the race is then fractured along the score line 3 by conventional impact fracturing means and the two fractured ends 4 and 5 spread apart by spreaders 6 and 7 to the position shown in FIG. 3. An inner spherical bearing member 8 is then inserted in the race so that its longitudinal axis, extending parallel to an aperture 9, is perpendicular to the longitudinal axis of the race.

Since the dimension of the bearing along its longitudinal axis is less than its diameter because of the cutoff where the aperture contacts an outer surface of the bearing, it is possible to position the bearing 8 in the race member as described above without forcing the bearing into contact with the hardened side walls of the race member. If the inner member were assembled so that its longitudinal axis was parallel to that of the race, the race would have to be spread considerably further than that shown in FIG. 3 which would be impractical and which would probably result in injury to the race.

Figure 4:
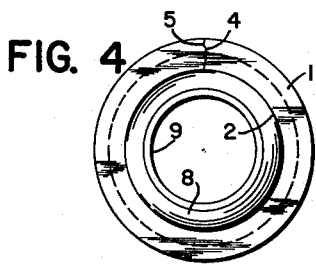
FIG. 4 is a front view of the spherical bearing assembly of FIG. 3 with the spherical bearing turned so that its longitudinal axis is substantially parallel to the axis of the race and with the fractured ends of the race together.
Figure 5:
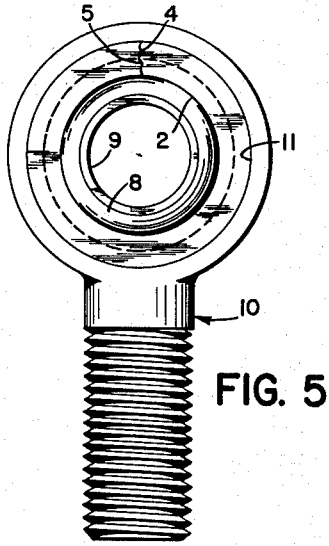
FIG. 5 is a front view of a rod end showing a bearing assembly inserted therein.

After the inner bearing member is positioned in the race, the spreaders 6 and 7 are removed so allowing the fractured ends to spring together. The bearing member 8 is then rotated so that its longitudinal axis is substantially parallel to that of the race as shown in FIG. 4. The bearing assembly which comprises the inner member 8 and outer race member 1 may then be inserted in a rod end 10, as illustrated in FIG. 5, or in a ring member.

The rod end 10 has a machined aperture 11 which is of substantially the same diameter as the outer diameter of the race 1 so that the fractured ends 4 and 5 will be held firmly together under load conditions and will not spread apart. The rod end may then be staked or roll crimped as at 12 and 13 to lock the race in the rod end.

Figures 6, 7:
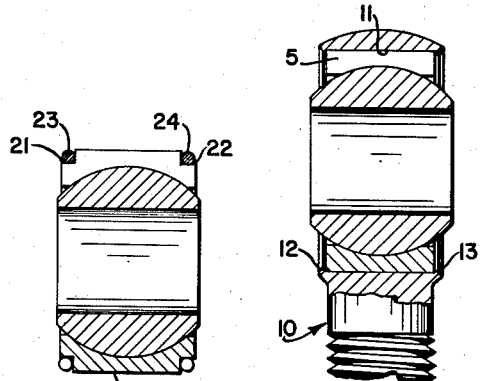
FIG. 6 is a cross-sectional view of FIG. 5.
FIG. 7 is a sectional view of a different embodiment of the spherical bearing assembly shown with the fractured ends of the outer race held together by snap rings; and, FIG. 8 is a partial front view of an outer race similar to that as shown in FIG. 1 except that the race is scored radially along its outer face.

Reference is made to FIG. 7 in which another embodiment of my invention is illustrated wherein the outer race member 20 has grooves 21 and 22 machined thereon. After the outer race member has been fractured and the inner bearing member inserted in the manner as shown in FIGS. 3 and 4, the fractured ends are allowed to spring together. Snap or locking rings 23 and 24 are applied around the outer periphery of the race in the grooves so as to firmly lock the fractured ends of the outer race together if desired, or may be used as is.

The spherical bearing assembly constructed in the manner described allows use of a hardened outer race member which may be accurately machined and precision ground in the spherical area and which will not bend under loads to give undue looseness between the race and inner bearing member. Further by fracturing the race only at one point rather than at two points, any roughness along the inner edges of the race surface is minimized. Even more important, however, is that the inner bearing may be made of a relatively soft material, such as a sintered powdered metal, which can be impregnated with a lubricant to provide a self-lubricating spherical bearing.

Figure 8:
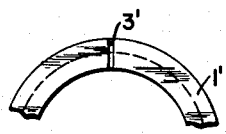

FIG. 8 illustrates an alternative method of scoring or notching wherein the score line 3' extends radially along a face of the outer race 1'. The race is fractured along the line and separated in a manner similar to that shown in FIG. 3 and the inner bearing inserted therein as shown in FIGS. 3 and 4.

It is obvious that changes may be made in details of the structure shown and that the invention is to be limited only by the appended claims.

I claim:
1. A spherical bearing assembly comprising:
   (a) an integral outer, hardened, steel spherical race member fractured at one point to provide normally abutting ends and hardened to approximately 60 Rc, and
   (b) an inner barrel-shaped spherical bearing member disposed within said outer race member in frictional engagement with the inner surface thereon and comprising a lubricant impregnated sintered metal having a yield point smaller than that of the outer race member.
2. A spherical bearing assembly comprising:
   (a) an integral circular outer steel, spherical race member hardened to approximately 60 Rc,
   (b) a single groove on the outer periphery of said outer race member extending in a direction parallel to the longitudinal axis of said outer race member and having substantially parallel side walls,
   (c) a substantially straight fracture extending in a radial direction in said outer race member from the bottom of said groove to the interior surface of said outer race member to provide normally abutting ends, and
   (d) an inner barrel-shaped spherical bearing member disposed within said outer race member in frictional engagement with the inner surface thereof.
3. A spherical bearing assembly according to claim 2 wherein said inner barrel-shaped spherical bearing member comprises a lubricant impregnated sintered metal having a relatively low yield point.
4. A spherical bearing assembly comprising:
   (a) an integral circular outer steel spherical race member having substantially parallel side faces and having a hardness of approximately 60 Rc,
   (b) a single groove in one of said side faces extending in a direction perpendicular to the longitudinal axis of said outer race member,
   (c) a single fracture extending in a direction substantially parallel to the longitudinal axis of said outer race member from said groove to the opposite face of said outer race member to provide normally abutting ends, and
   (d) an inner barrel-shaped spherical bearing member disposed within said outer race member in frictional engagement with the inner surface thereof.
5. A spherical bearing member according to claim 4 further including a circular outer ring member surrounding said outer race member to lock the fractured ends of said outer race member together.

References Cited by the Examiner
UNITED STATES PATENTS

| | | | |
|---|---|---|---|
| 2,541,160 | 2/51 | Heim | 29—149.1 |
| 2,624,645 | 1/53 | Virtue | 308—216 |
| 2,625,452 | 1/53 | Haller | 308—240 |
| 2,648,578 | 8/53 | Stearns et al. | 308—196 |
| 2,657,105 | 10/53 | Stearns | 308—196 |
| 2,758,365 | 8/56 | Ricefield | 29—149.5 |
| 2,767,034 | 10/56 | McCloskey | 308—72 |
| 2,781,238 | 2/57 | Carter | 308—72 |
| 2,804,679 | 9/57 | Tracy | 29—149.5 |
| 2,894,789 | 7/59 | Tracy | 308—72 |
| 2,952,144 | 9/60 | Holmes | 308—72 |

DON A. WAITE, *Primary Examiner.*

FRANK SUSKO, MILTON KAUFMAN, JACOB A. MANIAN, *Examiners.*

UNITED STATES PATENT OFFICE
CERTIFICATE OF CORRECTION

Patent No. 3,179,477                                    April 20, 1965

Richard O. Carter

It is hereby certified that error appears in the above numbered patent requiring correction and that the said Letters Patent should read as corrected below.

Column 3, line 57, for "thereon" read -- thereof --.

Signed and sealed this 8th day of February 1966.

(SEAL)
Attest:

ERNEST W. SWIDER                                EDWARD J. BRENNER
Attesting Officer                                      Commissioner of Patents